Oct. 12, 1965                 J. M. RUHGE                 3,211,911
METHOD AND PHOTOCELL DEVICE FOR OBTAINING
LIGHT SOURCE POSITION DATA
Filed Sept. 11, 1962

*INVENTOR.*
JUSTIN M. RUHGE

BY

*P. H. Firsht*

ATTORNEY.

United States Patent Office 3,211,911
Patented Oct. 12, 1965

3,211,911
METHOD AND PHOTOCELL DEVICE FOR OBTAINING LIGHT SOURCE POSITION DATA
Justin M. Ruhge, China Lake, Calif., assignor to the United States of America as represented by the Secretary of the Navy
Filed Sept. 11, 1962, Ser. No. 222,980
2 Claims. (Cl. 250—203)
(Granted under Title 35, U.S. Code (1952), sec. 266)

The invention herein described may be manufactured and used by or for the Government of the United States of America for governmental purposes without the payment of any royalties thereon or therefor.

The present invention relates to a device and method used in determining the relative position of a source of light focused on a lateral photocell, and more particularly to a device and method used in determining the position of a variably positioned bar, spot, or point, of light focused on the surface of a single lateral photocell with a varying intensity.

A lateral photocell is a semiconductor, voltage-generating device which may be formed on an N-type silicon into which a P-type silicon layer, or P-layer is diffused. A pair of electrical terminals are mounted in spaced relationship along the portion of the cell formed of N-type silicon and serve as voltage output terminals when an electrical current is caused to flow by a bar, spot or point of light being focused on the surface of the P-layer at a point of impingement located between the terminals. The voltage output appearing at the terminals is caused to vary either through a change of intensity of the impinging light spot or with changes of location of the point of impingement of the spot on the surface of the cell relative to the terminals. Thus, provided there is a constant intensity, the output at the cell terminals along the surface of the N-type silicon is a function of the location of the point of impingement and the changes in the values of the output serve to indicate changes in location of the point of impingement.

Because of certain unique characteristics of the lateral photocell, an effort has been made to utilize it in the field of missile experimentation in look-angle indicator systems, of the general nature disclosed in co-pending application Serial No. 150,848, filed November 7, 1961, now Patent No. 3,181,814, which serve to indicate the angle between a target and the longitudinal axis of a missile before and at the time of fuze operation in order to evaluate the effectiveness of the missile. Among the important characteristics of this cell which serve to render it desirable, certain aspects are particularly noted. First, the voltage output from the cell is not seriously affected by high ambient background, such as daylight illumination, so long as the cell is uniformly illuminated by the background light. For the case in which the cell is illuminated by the background light and the target, the cell will see only that light source which changes position, hence, a filter system for the cell is not essential. Second, the lateral photocell also serves to indicate the position, or location of the center of the spot or bar of radiation focused on its surface. If the size of the spot, which is impinging on the surface of the cell, is maintained within a given range the cell's effective indications will be unaffected and the cell will continue to emit signals effectively until the area of the spot is increased to exceed the range.

In order to utilize the lateral photocell for indicating the relative position of a variably positioned spot or bar of light as it impinges on the surface of the cell, it is necessary that the intensity of the radiation, or light, be a known factor. This necessity has impeded the utilization of lateral photocells in the field of look-angle indicators, since the intensity of a point of light being focused on the surface of a lateral photocell will, in practice, vary under certain conditions and will accordingly effect a variation in the voltage output. For example, the intensity of a point or spot of light impinging on the surface of a lateral photocell, in a missile look-angle indicator system, will vary proportionally as the distance of the cell to the source is caused to vary through the closing of the missile with its target. Therefore, it is necessary that the intensity of a spot of light impinging on the surface of the cell in a look-angle indicator be a known value to provide a reference value at the instant the position of the point of light impinging on the cell is to be determined. One system, through which the intensity of a spot of light may be determined as it impinges on the surface of the lateral photocell, is disclosed in applicant's co-pending application, Serial No. 223,311, filed September 11, 1962, now U.S. Letters Patent 3,161,375, granted December 15, 1964. This system utilizes an auxiliary light sensitive cell having a surface so arranged adjacent the surface of the lateral photocell as to receive a portion of a spot or bar of light being focused on the lateral photocell in order to determine the intensity thereof. Under a given set of conditions this solution may be considered satisfactory; however, in utilizing an auxiliary light sensitive cell, certain undesirable requisites are present. For example, in order that the position of a spot of light may be determined through having the spot focused on both cells simultaneously, it is necessary to provide an auxiliary cell properly matched in size and shape with the lateral cell being utilized, and further, it is necessary that either cylindrical optics, which form a bar of light on both cells simultaneously, or a matched set of spherical optics be utilized for focusing the light on the surface of the plurality of cells. Hence, such a system inherently tends to be somewhat complicated, and relatively heavy, due to the inherent multiplicity of components necessarily present in such a system.

The general purpose of this invention is to provide a method and a simple lightweight photocell device which may be utilized for determining the relative location of a variably positioned source of light impinging with an intensity of variable magnitude, in the form of a spot or bar of light, as it is caused to traverse the surface of the device in an indefinite manner.

Therefore, an object of the present invention is to provide a method for determining the relative location of a variably positioned spot of light as it is caused to impinge, with an intensity of a variable magnitude, on the surface of a single lateral photocell in order for the relative position of the source to be determined.

Another object of the invention is to provide a simple lightweight single celled light sensitive device capable of being mounted in relatively smaller missiles for indicating the instant position of a variably positioned spot or bar of light radiated from the target and focused on the surface of the device with varying intensity.

Other objects, advantages and novel features of the invention will become apparent from the following detailed description of the invention when considered in conjunction with the accompanying drawings wherein.

Figure 1:
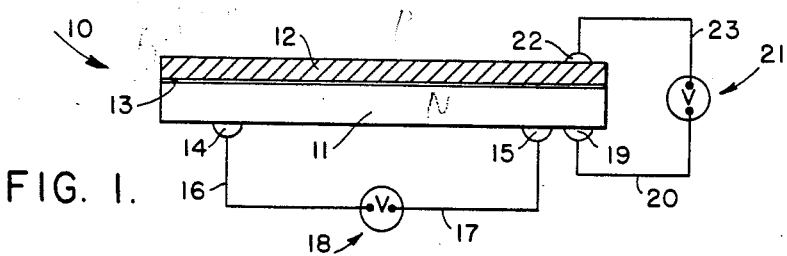
FIG. 1 is a vertical cross sectional schematic of the lateral photocell of the present invention illustrating the P-N junction and the relative disposition of the various components.

Referring now more specifically to the drawing, wherein the same reference characters designate like or corresponding parts throughout the several views, there is shown in FIG. 1 a lateral photocell, generally designated by the reference numeral 10, which is a semiconductor, voltage-generating device made of an N-type silicon body 11 into which a P-type silicon layer 12 is diffused to form a P-N junction generally designated by the reference numeral 13. Along the surface of the N-type silicon, or N-surface of the cell body 11, opposite the P-N junction, there is disposed a pair of spaced electrical output terminals 14 and 15 having leads 16 and 17 extending to a voltage measuring device 18 for determining the cell generated voltage output which occurs between terminals 14 and 15 a spot of light is focused therebetween on the surface of the P-layer of the cell. Located adjacent the terminal 15, disposed on the N-surface, there is a voltage output terminal 19 having a lead 20 extending to one input side of a voltage measuring device 21. Opposite the terminal 19 at the outer surface of the P-layer 12, or P-surface, there is disposed a terminal 22 having a lead 23 extending to an opposite input side of the measuring device 21, whereby the cell generated voltage output occurring between the terminals 19 and 22 may be constantly determined, independently of the output simultaneously occurring at the terminals 14 and 15. It is here to be noted that the terminals 15 and 19 may comprise a common terminal without creating any adverse effects, for apparent reasons.

Therefore, it is to be understood that the cell generated voltage occurring between the terminals 14 and 15, measurable at the device 18 and hereinafter referred to as lateral voltage, is a function of the location of a spot of light focused on its surface and is critically affected by any changes in the magnitude of the intensity of the spot of light as it impinges thereon. However, the cell generated voltage occurring between the terminals 19 and 22, measurable at the device 21 and hereinafter referred to an intensity voltage, is a function of the magnitude of the intensity of the spot of light as it impinges on the surface of the cell and is independent of, and is unaffected by displacements of the center of the spot along the surface of the cell.

Figure 3:
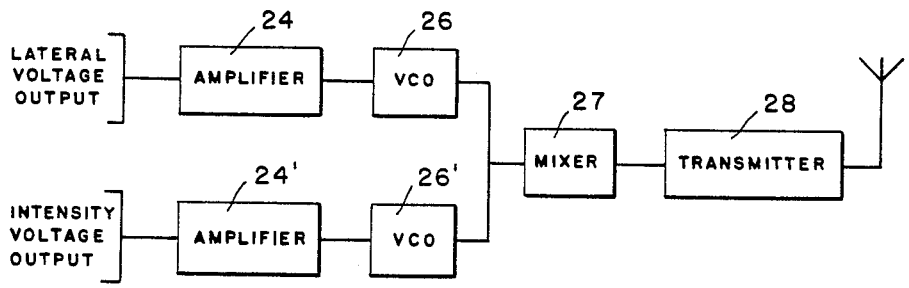
FIG. 3 is a schematic view illustrating a circuit diagram for a missile mounted look-indicator system.

While devices 18 and 21 are shown as means for measuring voltage outputs from the cell, it is understood that the data obtained through these devices may be transmitted through a circuit, such as schematically illustrated in FIG. 3, to remote receivers. As shown in FIG. 3, the data obtained through the pairs of terminals 14, 15 and 19, 22 is fed into amplifiers 24, 24' for amplification, then to voltage-controlled subcarrier oscillators 26, 26', mixer 27, and then to a transmitter 28 for transmission to a remote receiver.

Figure 2:
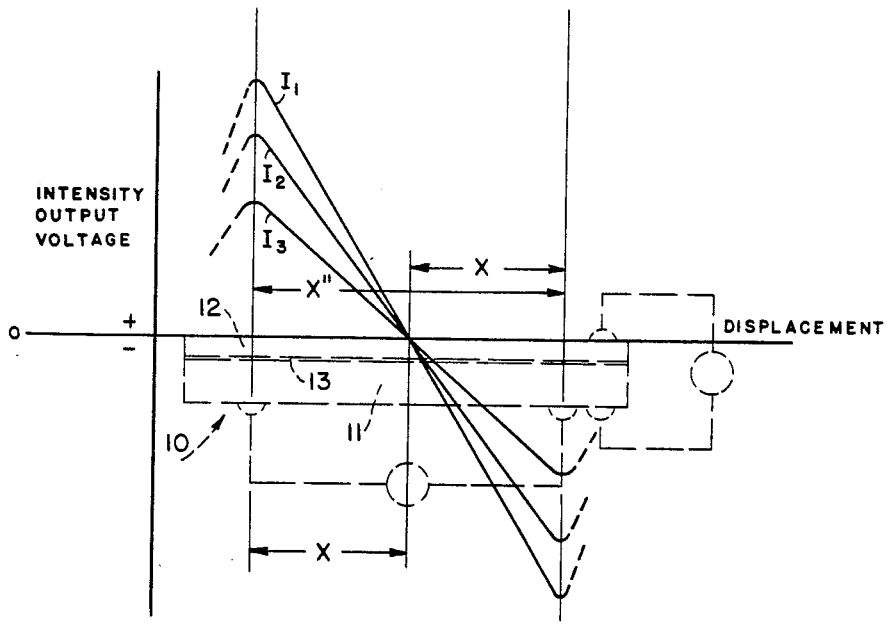
FIG. 2 is a schematic of FIG. 1, shown in dotted lines, with a plurality, or family of intensity indicating voltage output curve slopes superimposed thereon.

The magnitude of the lateral voltage occurring at the terminals 14 and 15 is indicative of the location of the impinging spot, however, it is necessary that the value of the possible maximum lateral voltage be known at the time the actual location of the spot impinging on the cell is to be determined. The maximum intensity voltage that may be obtained from the cell at the given intensity is present at the intensity voltage output terminals. It is noted that if the intensity is maintained constant, and the spot impinging on the P-surface at a location adjacent a lateral voltage terminal is displaced to a position spaced from, and between the terminals, the value of the lateral voltage is reduced in proportion to the displacement until the center of the spot is positioned at the center between the terminals, at which point the voltage output passes through zero and increases with a reverse polarity until the reverse maximum voltage output is achieved when the spot is adjacent a lateral voltage terminal, as schematically illustrated in FIG. 2. As shown in FIG. 2, when given a series of intensity levels, voltage output curves $I_1$, $I_2$ and $I_3$ may be established. Therefore, it is possible to achieve a plurality of values for the lateral voltage at a constant intensity voltage, merely by displacing the spot to a number of positions between the position indicating terminals. However, where the intensity varies the curves are not linear, and therefore, calibration is necessary to establish the maximum possible lateral voltage output at a known intensity in order to relate the lateral and intensity voltages.

In order to accurately determine the value of the possible maximum lateral voltage for deriving the actual location of the spot or bar of light on the surface of the cell at a given time, and consequently the value of the look-angle being measured, it is necessary to calibrate each cell for various intensities ranges to determine the relationship between the intensity voltage output and the lateral voltage output, since each cell's reaction to a given intensity range may vary somewhat from that of other cells having a similar composition and size. Calibration may be with as many intensity values as is found necessary to provide necessary refinement.

Calibration may be effected by focusing a spot of light of known intensity onto the P-surface of the cell at a position adjacent a lateral voltage terminal, for example 14, to obtain both an intensity voltage output and a maximum lateral voltage output. Intensity-voltage curves can now be obtained by changing the light intensity over a given range to provide a calibrated cell. Depending on the response indicated at the two pairs of terminals for a given cell, there can be established a mathematical relationship (linear, exponential, logarithmic, etc.) between their outputs for a given intensity. When, in operation, the spot of light is moved to another point on the P-surface of the cell, and the intensity allowed to vary, a voltage less than the maximum will appear at the lateral terminals. Now, by observing the intensity voltage one can ascertain the maximum lateral voltage that could be expected for the observed intensity voltage. If the expected maximum is observed then the spot of light is at the point of peak response. For all voltages less than the maximum the spot will be somewhere between the point of peak response, or the position adjacent a lateral voltage output terminal and zero, or the center of the cell, as diagrammatically illustrated in FIG. 2. The actual position can be obtained by taking the difference between maximum and observed voltage values, dividing the resulting difference by the maximum voltage value, and multiplying this result by the distance between the peak response position and the center of the cell.

The exact look-angle may be obtained, for a 45° field of view, utilizing the above principles as expressed in terms of a mathematical equation. When $V_I$ is intensity voltage, $V_L$ is lateral voltage, $V_{LM}$ is peak lateral voltage at fixed intensity, X is the distance between the point on the cell at which a spot or bar of light renders peak lateral voltage and the center of the cell, $k$ is the valve, or established relationship between the intensity voltage and the lateral voltage by which intensity voltage is multiplied to obtain peak lateral voltage at various intensities, and X" is the distance between the points on the cell at which a spot or bar of impinging light causes peak lateral voltage to occur, the equation $$\frac{(V_I \cdot k - V_L) \cdot X \cdot 45°}{V_I \cdot k \cdot X''} = \theta$$

may be used to render the exact value for the look-angle for a 45° field of view which is made linear at the focus by a last element in a lens system provided for the device so that there is a one to one correspondence between position and angle.

The above equation can be solved by hand for a particular point, or it can be programmed for a computer and $\theta$ obtained for many points. However, in order for the device to be reliable in operation, the relationship $k$ must be established for the maximum intensities that are to be encountered.

The values of the voltage outputs are telemetered and utilized at a remote station for determining the location of the source of the light in space. Means, such as an electronic computer, not shown, as it forms no specific part of the instant invention, may be utilized to reduce the information in accordance with the above stated principles.

In practice, while the area of the spot, bar or point of light may be caused to vary in size as the intensity of the light changes, it is to be understood that the voltage outputs will not be adversely affected, through such variance so long as the area covered by the spot is within a predetermined range, since the changing area size of the spot will be relatively insignificant for the given cell utilized in the manner above described. For example, it has been found in practice that the intensity output will not be caused to change through variations in area coverage so long as the width of the spot or bar does not exceed 20 percent of the distance between the terminals. Hence, the device is capable of functioning well within the limitations imposed by look-angle indicator systems.

Obviously many modifications and variations of the present invention are possible in the light of the above teachings. It is therefore to be understood that within the scope of the appended claims the invention may be practiced otherwise than as specifically described.

What is claimed is:
1. In a method wherein a single voltage-generating photocell is utilized for determining positions of a source of light, the steps comprising:
 (a) providing a lateral photocell formed of an N-type silicon body joined at a first surface with a first surface of a P-type silicon layer for forming a P-N junction therebetween and having a first pair of light position indicating voltage output terminals arranged on a second surface of said body opposite said first surface in a manner such that the terminals of said first pair are disposed in spaced relationship for defining an area therebetween on said second surface of said body at one side of said junction, and having a second pair of light intensity indicating voltage output terminals so arranged as to have a first terminal of said second pair disposed at said second surface of said body adjacent one terminal of said first pair, with the other terminal of said second pair of terminals being disposed on a second surface of said P-type silicon layer in a manner such that the terminals of said second pair of terminals are oppositely disposed on said body and layer at either side of said junction;
 (b) directing a beam of source-generated light to impinge as a spot on said second surface of said P-layer within an area coextensive with the area defined by the terminals of said first pair of terminals for causing independent output voltages to be generated and occur across said first and second pairs of terminals;
 (c) deriving a first voltage value, indicative of light spot position, present across said first pair of terminals;
 (d) deriving a second voltage value, indicative of light intensity, present across said second pair of terminals simultaneously with the step of deriving said first voltage value, and
 (e) comparing the simultaneously derived voltage values, whereby the actual point of impingement for the source generated light appearing as a spot on the surface of said P-layer may be accurately determined on the basis of the derived output voltage values.

2. In a system for locating a space oriented source for incident light waves having continuously changing angles of incidence and continuously changing values of intensity, means comprising in combination:
 (a) a single voltage-generating photocell including an N-type silicon body having at least a first and a second elongated surface disposed in mutually-opposed, parallel alignment, and an elongated P-type silicon layer diffused within the first surface defining a P-N junction between the body and a first side of the layer and providing an exterior surface disposed in a light-receiving position at a second side thereof and aligned in a mutually-opposed relationship with the first side of the layer and extending coextensively and in generally parallel alignment with said P-N junction;
 (b) a first pair of voltage output terminals mounted on said body and disposed in a mutually-spaced relationship along the second surface thereof and opposite said P-N junction;
 (c) a second pair of voltage output terminals so arranged as to have a first terminal of said second pair of terminals disposed on the second surface of said body adjacent one terminal of said first pair of terminals, and to have a second terminal of said second pair of terminals disposed on the exterior surface of said layer opposite said first terminal of said second pair of terminals, so that the terminals of said second pair of terminals are caused to be disposed in coaxial alignment at opposite sides of said P-N junction; are caused to be disposed in coaxial alignment at
 (d) a first voltage detecting means connected between the terminals of said first pair of voltage output terminals; and
 (e) a second voltage detecting means connected between the terminals of said second pair of voltage output terminals, whereby independent and mutually-exclusive output voltage values may be simultaneously derived for comparison from said first and said second voltage detecting means as a spot of source-generated light waves is caused to impinge on the exterior surface of said layer, within an area disposed in opposed alignment with an area defined between the first pair of terminals, with a changing value of intensity and a changing relative position, varying with respect to both pairs of terminals, so that the position of the spot relative to the pairs of terminals and the exterior surface may be accurately determined.

References Cited by the Examiner

UNITED STATES PATENTS

| | | | |
|---|---|---|---|
| 2,406,139 | 8/46 | Fink et al. | 250—212 X |
| 2,629,802 | 2/53 | Pantcheschnihoff | 250—212 X |
| 2,812,446 | 11/57 | Pearson | 250—211 |
| 2,895,067 | 7/57 | Deloffre et al. | 250—203 X |
| 2,976,758 | 3/61 | Parker | 250—203 X |
| 2,986,644 | 5/61 | Cheroff | 250—212 X |
| 2,993,998 | 7/61 | Lehovec | 250—211 |
| 3,028,500 | 4/62 | Wallmark | 250—203 X |
| 3,038,079 | 6/62 | Mueller | 250—203 |
| 3,051,840 | 8/62 | Davis | 250—211 |
| 3,076,949 | 2/63 | Anderson | 250—203 X |
| 3,081,418 | 3/63 | Manintveld et al. | 307—88.5 |
| 3,092,725 | 6/63 | Grimmeiss et al. | 250—212 |
| 3,098,934 | 7/63 | Wilson et al. | 250—203 |

RALPH G. NILSON, *Primary Examiner.*

ARCHIE BORCHELT, FREDERICK M. STRADER,
*Examiners.*